United States Patent [19]

Tsunoda et al.

[11] Patent Number: 5,077,829
[45] Date of Patent: Dec. 31, 1991

[54] RADIO COMMUNICATION APPARATUS IN WHICH A PARTICULAR CALL CAN BE SURELY INFORMED TO A POSSESSOR OF THE APPARATUS

[75] Inventors: Kazuyuki Tsunoda, Tokyo; Kazumori Yamada, Shizuoka, all of Japan

[73] Assignee: NEC Corporation, Tokyo, Japan

[21] Appl. No.: 552,048

[22] Filed: Jul. 13, 1990

[30] Foreign Application Priority Data

Jul. 13, 1989 [JP] Japan .................................. 1-179116

[51] Int. Cl.$^5$ ............................................... H04Q 7/00
[52] U.S. Cl. ..................................... 455/38; 455/228; 340/825.44
[58] Field of Search .................. 455/38, 228, 343, 156; 340/825.44, 311.1

[56] References Cited

U.S. PATENT DOCUMENTS

| | | | |
|---|---|---|---|
| 4,422,178 | 12/1983 | Mori | 340/825.44 |
| 4,506,386 | 3/1985 | Ichikawa et al. | 340/825.44 |
| 4,523,332 | 6/1985 | Mori | 455/228 |
| 4,606,076 | 8/1986 | Davis | 455/343 |
| 4,768,631 | 8/1988 | Mori et al. | 455/38 |

*Primary Examiner*—Curtis Kuntz
*Attorney, Agent, or Firm*—Sughrue, Mion, Zinn, Macpeak & Seas

[57] ABSTRACT

In a radio communication apparatus in which an audible tone is generated (21–22) in response to reception (15–17, 19) of either a primary or a secondary call signal and stopped by a reset switch (23), the audible tone is stopped (172, 18) when the secondary call signal is received. When the primary call signal is received, the audible tone is not stopped unless the reset switch is continuously closed during a predetermined time interval. Alternatively, the audible tone is stopped when the reset switch is twice closed although the audible tone is produced again after the audible tone is stopped when the reset switch is once closed. As a further alternative, the audible tone is stopped in response to repeated closure of the reset switch without being again produced when the reset switch is once closed.

11 Claims, 8 Drawing Sheets

RADIO COMMUNICATION APPARATUS IN WHICH A PARTICULAR CALL CAN BE SURELY INFORMED TO A POSSESSOR OF THE APPARATUS

BACKGROUND OF THE INVENTION

This invention relates to a radio communication apparatus for use in selectively receiving a plurality of call signals indicative of a plurality of call numbers, respectively. The radio communication apparatus may be a radio paging receiver although description will be mainly directed to the radio paging receiver.

The radio paging receiver of the type described includes a receiving circuit for receiving, as a received signal, each of a primary and a secondary call signal, both specific to the receiver. The primary call signal is for use in carrying out a particular call of a possessor of the receiver. The secondary call signal is for use in carrying out a normal call of the possessor. The receiving circuit produces an internal signal whenever the receiving circuit receives each of the primary and the secondary call signals.

The radio paging receiver further comprises a tone generator for generating an audible tone in response to the internal signal with a controllable volume. In order to stop the audible tone, the paging receiver comprises a manually operable switch which is generally called a reset switch. When manually operated by the possessor, the reset switch produces a tone stop instruction signal. Responsive to the tone stop instruction signal, the tone generator stops the audible tone.

For use in making the possessor discriminate between the particular call from the normal call, the audible tone has a particular and a normal volume level which are different from one another. That is, the tone generator is controlled so that the particular volume level is assigned to the particular call and that the normal volume level is assigned to the normal call. Accordingly, it is possible in theory to discriminate the particular call from the normal call by hearing the audible tone.

However, it is actually very difficult for the possessor to discriminate the particular volume level from the normal volume level by the audible tone. Because it is substantially impossible to exactly recognize the particular volume level by hearing only the audible tone without carrying out comparison with the normal volume level.

In addition, the possessor may have a custom of manually operating the reset switch to stop the audible tone as soon as the tone generator generates the audible tone. This makes it impossible for the possessor to judge whether or not the received signal is the primary call signal.

SUMMARY OF THE INVENTION

It is therefore an object of this invention to provide a radio communication apparatus in which a particular call can be informed to a prossessor of the apparatus without fail.

It is another object of this invention to provide a radio communication apparatus of the type described, in which information operation is clearly carried out as regards whether or not a currently received signal is the particular call of the prossessor.

It is still another object of this invention to provide a radio communication apparatus of the type described, in which stop of the audible tone is restricted regardless of a tone stop signal when the particular call is received.

Other objects of this invention will become clear as the description proceeds.

On describing the gist of this invention, it is possible to understand that a radio communication apparatus comprises receiving means for receiving, as a received signal, each of a primary and a secondary call signal to produce an internal signal, generating means connected to the receiving means for generating an audible tone in response to the internal signal, manually operable producing means for producing a tone stop instruction signal, means connected to the receiving, the generating, and the manually operable producing means for controlling operation of the generating means so that the audible tone is stopped in response to the tone stop instruction signal, judging means connected to the receiving means for judging whether or not the received signal is the primary call signal, the judging means producing a particular signal when the received signal is the primary call signal, and restricting means connected to the generating, the manually operable producing, and the judging means for restricting stop of the audible tone with reference to the particular signal regardless of the tone stop instruction signal produced after said particular signal.

DESCRIPTION OF THE PREFERRED EMBODIMENTS

Figure 1:
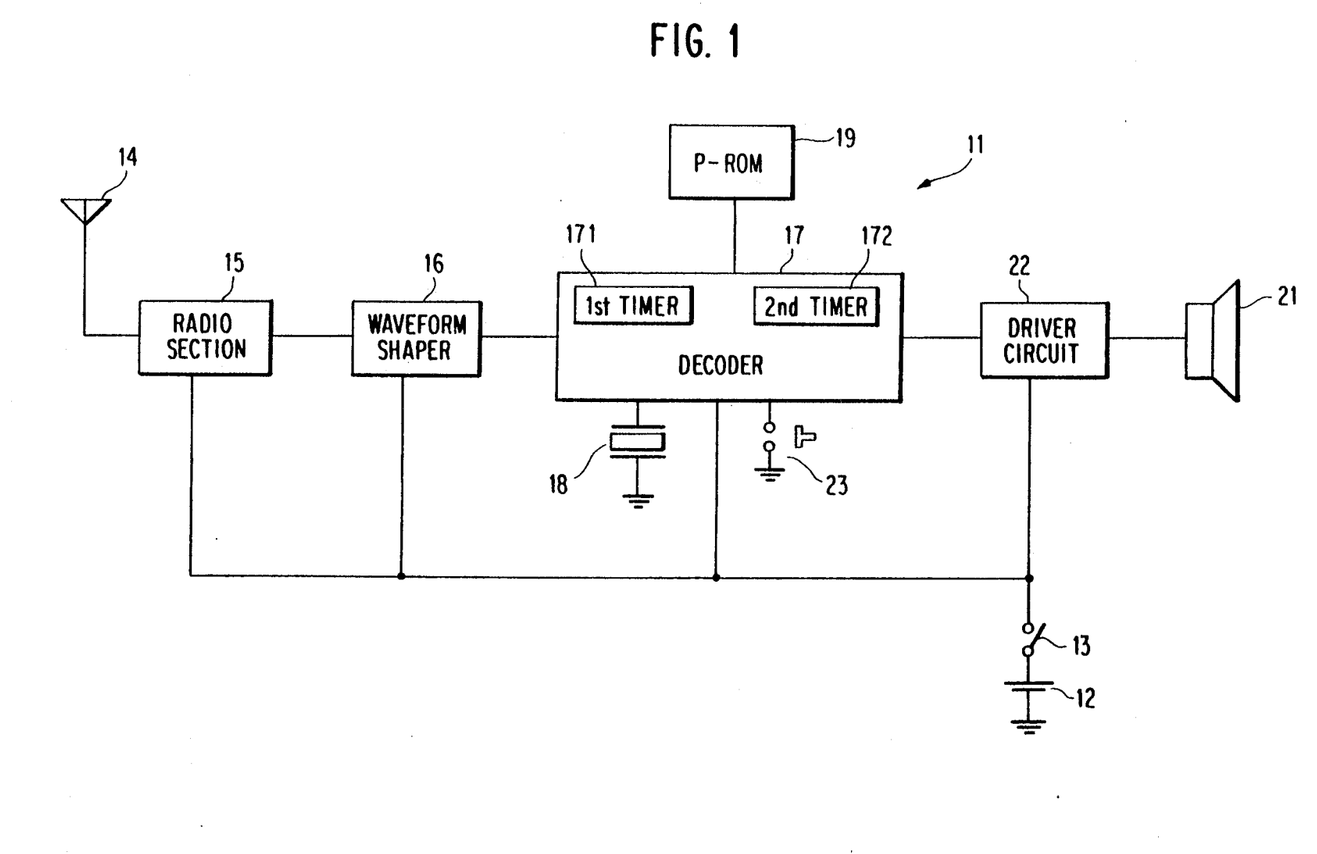
FIG. 1 is a block diagram of a radio paging receiver according to a first embodiment of this invention.

Referring to FIG. 1, a radio paging receiver 11 according to a first embodiment of this invention is for selectively receiving a plurality of call signals, such as a primary and a secondary call signal indicative of a primary and a secondary call number, respectively, which are specific to the receiver 11. Each of the call signals is transmitted as a radio signal from a transmitting station (not shown).

The radio paging receiver 11 is for use in combination with a battery 12 for generating electric power. The radio paging receiver 11 is connected to the battery 12 through a manually operable power source switch 13 and activated by the electric power when the switch 13 is closed to an on state.

The radio signal is picked up by an antenna 14 and supplied to a radio section 15. When the radio section 15 is activated by the electric power supplied from the battery 12 through the switch 13, the radio section 15 converts or demodulates the radio signal into a baseband or demodulated signal. The demodulated signal is supplied to a waveform shaper 16. The waveform shaper 16 is activated by the electric power to shape a waveform of the demodulated signal into a shaped signal of a digital waveform. The shaped signal supplied to a decoder 17.

When activated by the electric power, the decoder 17 cooperates with a quartz crystal oscillator 18 and a P-ROM (programmable read-only memory) 19 in response to the shaped signal to produce a call tone signal as an internal signal in the manner known in the art. Herein, a combination of the antenna 14, the radio section 15, the waveform shaper 16, and the decoder 17 is referred to as a receiving arrangement.

The P-ROM 19 memorizes, as a memorized content, a primary and a secondary directory number signal indicative of the primary and the secondary directory numbers which correspond to the primary and the secondary call numbers, respectively.

A loudspeaker 21 is connected to the decoder 17 through a driver circuit 22 of, for example, an amplifier activated by the electric power. Responsive to each of the call tone signals, the loudspeaker 21 generates an audible tone with a controllable volume. That is, the loudspeaker 21 serves, in cooperation with the driver circuit 22, as a tone generator for generating the audible tone with the controllable volume. The decoder 17 comprises first and second timers 171 and 172 for determining a first and a second predetermined time duration which will later become clear. Each of the first and the second timers 171 and 172 is coupled to the quarts crystal oscillator 18 and serves as a time determining arrangement.

A manually operable reset switch 23 is connected to the decoder 17 to produce a tone stop instruction signal when the reset switch 23 is closed to the on state by a possessor of the radio paging receiver 11. Herein, the reset switch 23 is referred to as a manually operable producing arrangement.

Figure 2:
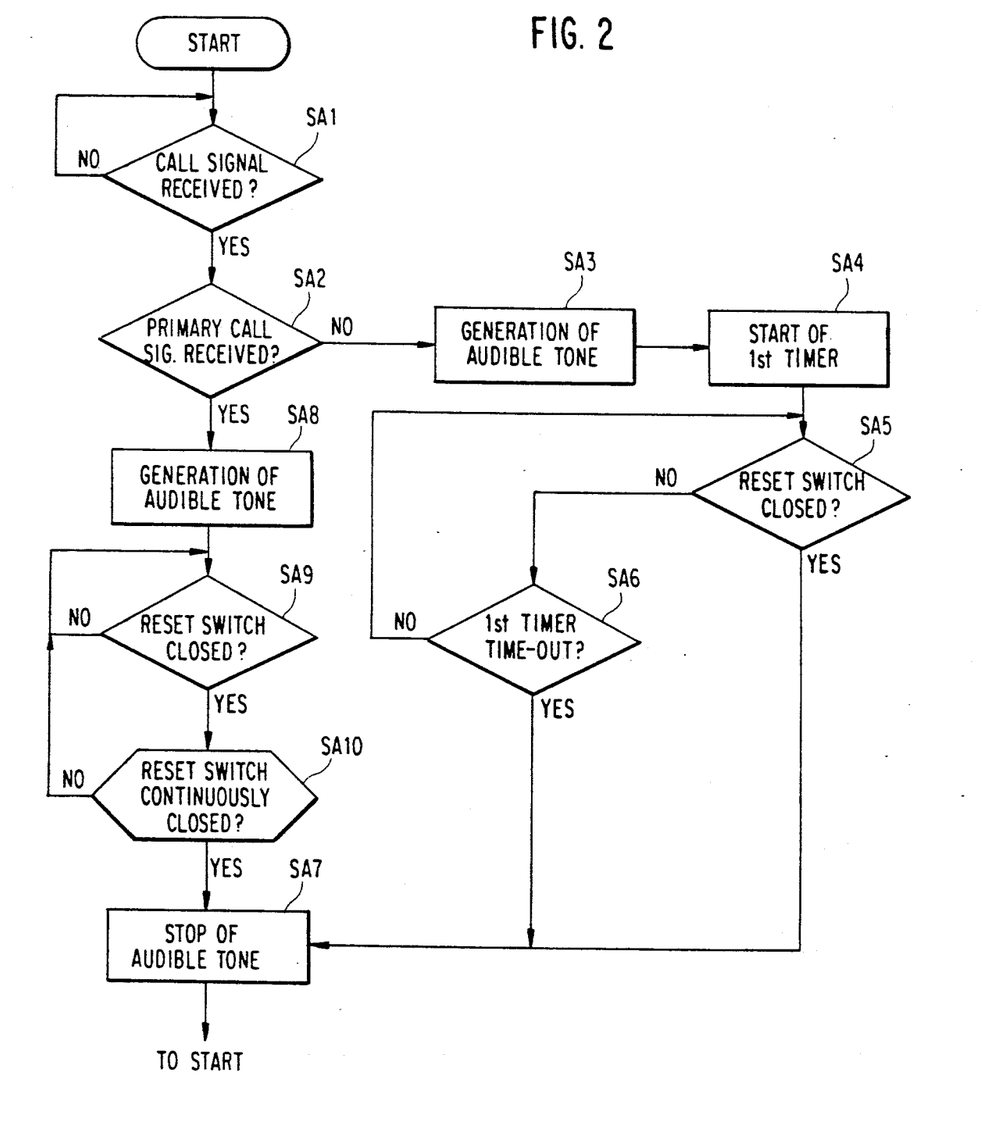
FIG. 2 is a flow chart for use in describing operation of the radio paging receiver illustrated in FIG. 1.

Referring to FIG. 2 together with FIG. 1, operation of the decoder 17 will be described in detail. When the decoder 17 is supplied with the shaped signal from the waveform shaper 16, the decoder 17 judges at a first stage SA1, in cooperation with the P-ROM 19, whether or not the shaped signal is related to one of the primary and the secondary directory number signals. That is, the decoder 17 judges with reference to the memorized content of the P-ROM 19 whether or not either one of the primary and the secondary call signals is received as a received signal. When the shaped signal is coincident with either one of the primary and the secondary directory number signals, the first stage SA1 proceeds to a second stage SA2. Otherwise, the first stage SA1 is repeatedly carried out.

At the second stage SA2, the decoder 17 carries out judgement whether or not the shaped signal is coincident with the primary directory number signal. In this manner, the decoder 17 serves as a judging arrangement. When the shaped signal is not coincident with the primary directory number signal, the second stage SA2 is followed by a third stage SA3.

At the third stage SA3, the decoder 17 processes the shaped signal into the call tone signal. Responsive to the call tone signal, the driver circuit 22 drives the loudspeaker 21. As a result, the loudspeaker 21 generates the audible tone in the manner known in the art.

The third stage SA3 is succeeded by a fourth stage SA4 at which the decoder 17 makes the first timer 171 start operation of the first timer 171 when the shaped signal is processed into the call tone signal. The first timer 171 produces a first time-out signal when the first predetermined time duration lapses after start of operation of the first timer 171. The first predetermined time duration may be twenty through thirty seconds long. The fourth stage SA4 proceeds to a fifth stage SA5.

At the fifth stage SA5, the decoder 17 carries out judgement whether or not the reset switch 23 is closed. When the reset switch 23 is not closed, the fifth stage SA5 proceeds to a sixth stage SA6 which will presently be described. When the reset switch 23 is closed to produce the tone stop instruction signal, the fifth stage SA5 is succeeded by a seventh stage SA7 at which the decoder 17 makes the loudspeaker 21 stop generation of the audible tone. Therefore, the decoder 17 may be referred to herein as a controlling arrangement.

At the sixth stage SA6, the decoder 17 carries out judgement whether or not the first time-out signal is produced. When the judgement indicates a negative result, operation returns to the fifth stage SA5. When the judgement indicates an affirmative result, the sixth stage SA6 proceeds to the seventh stage SA7 at which the decoder 17 makes the loudspeaker 21 stop generation of the audible tone.

Description will return to the second stage SA2. When the shaped signal is coincident with the primary directory number signal, the decoder 17 produces a particular signal. When the particular signal is produced in the decoder 17, the second stage SA2 is succeeded by an eighth stage SA8. At the eighth stage SA8, the decoder 17 processes the shaped signal into the call tone signal. Responsive to the call tone signal, the driver circuit 22 drives the loudspeaker 21 like the above-described case where the shaped signal is coincident with the secondary directory number signal. As a result, the loudspeaker 21 generates the audible tone.

The eighth stage SA8 proceeds to a ninth stage SA9. At the ninth stage SA9, the decoder 17 carries out judgement whether or not the reset switch 23 is closed. When the reset switch 23 is closed, the ninth stage SA9 proceeds to a tenth stage SA10 which will presently be described. Otherwise, the ninth stage SA9 is repeatedly carried out.

At the tenth stage SA10, the decoder 17 carries out judgement whether or not the reset switch 23 is continuously closed while the second predetermined time duration lapses after the reset switch 23 is closed. In this event, the decoder 17 serves as a judgement carrying out arrangement. The second predetermined time duration is determined by the second timer 172 and may be two or three seconds long. Therefore, the second timer 17 is referred to as a time determining arrangement. When the reset switch 23 is opened before lapse of the second predetermined time duration, operation returns to the ninth stage SA9. Namely, the audible tone is not stopped in spite of closing of the reset switch 23. In this event, the decoder 17 restricts stop of the audible tone regardless of the tone stop instruction signal produced after the particular signal. In this manner, the decoder 17 serves as a restricting arrangement which restricts the stop of the audible tone unless the tone stop instruction signal is continuously produced during the second predetermined time duration after production of the particular signal.

When the reset switch 23 is continuously closed during the second predetermined time, the decoder 17 produces a second time-out signal and may therefore be referred to herein as a judgement carrying out arrangement. When the second time-out signal is produced, the tenth stage SA10 proceeds to the seventh stage SA7 at which the decoder 17 makes the loudspeaker 21 stop generation of the audible tone. In this event, the decoder 17 serves as a releasing arrangement.

With the radio paging receiver, the possessor can surely recognize reception of the primary call signal because the audible tone is not stopped in spite of closing of the reset switch 23.

Figure 3:
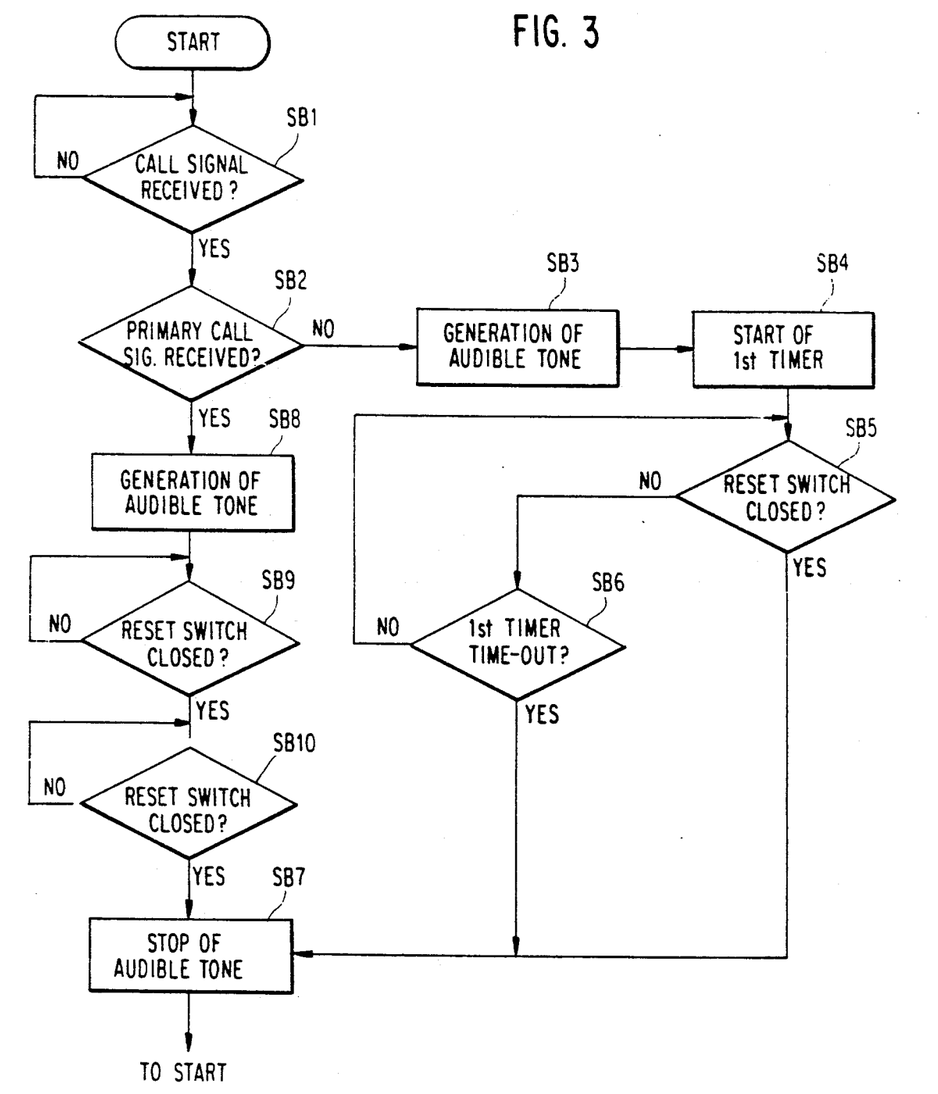
FIG. 3 is a flow chart for use in describing operation of a radio paging receiver according to a second embodiment of this invention.

Referring to FIG. 3 together with FIG. 1, description will be made in connection with a radio paging receiver according to a second embodiment of this invention. When the decoder 17 is supplied with the shaped signal from the waveform shaper 16, the decoder 17 judges at a first stage SB1, in cooperation with the P-ROM 19, whether or not the shaped signal is related to one of the primary and the secondary directory number signals. That is, the decoder 17 judges with reference to the memorized content of the P-ROM 19 whether or not either one of the primary and the secondary call signals is received as the received signal. When the shaped signal is coincident with one of the primary and the secondary directory number signals, the first stage SB1 proceeds to a second stage SB2. Otherwise, the first stage SB1 is repeatedly carried out.

At the second stage SB2, the decoder 17 carries out judgement whether or not the shaped signal is coincident with the primary directory number signal. Herein, the decoder 17 serves as the judging arrangement. When the shaped signal is not coincident with the primary directory number signal, the second stage SB2 is followed by a third stage SB3.

At the third stage SB3, the decoder 17 processes the shaped signal into the call tone signal. Responsive to the call tone signal, the driver circuit 22 drives the loudspeaker 21. As a result, the loudspeaker 21 generates the audible tone in the manner known in the art.

The third stage SB3 is succeeded by a fourth stage SB4 at which the decoder 17 makes the first timer 171 start its operation when the shaped signal is processed into the call tone signal. The first timer 171 produces a first time-out signal when the first predetermined time duration lapses after start of operation of the first timer 171. The first predetermined time duration may be twenty through thirty seconds long. The fourth stage SB4 proceeds to a fifth stage SB5.

At the fifth stage SB5, the decoder 17 carries out judgement whether or not the reset switch 23 is closed. When the reset switch 23 is not closed, the fifth stage SB5 proceeds to a sixth stage SB6 which will presently be described. When the reset switch 23 is closed to produce the tone stop instruction signal, the fifth stage SB5 is succeeded by a seventh stage SB7 at which the decoder 17 makes the loudspeaker 21 stop generation of the audible tone. Therefore, the decoder 17 may be referred to herein as the controlling arrangement.

At the sixth stage SB6, the decoder 17 carries out judgement whether or not the first time-out signal is produced. When the judgement indicates a negative result, operation returns to the fifth stage SB5. When the judgement indicates an affirmative result, the sixth stage SB6 proceeds to the seventh stage SB7 at which the decoder 17 makes the loudspeaker 21 stop generation of the audible tone.

Description will return to the second stage SB2. When the shaped signal is coincident with the primary directory number signal, the decoder 17 produces a particular signal. When the particular signal is produced in the decoder 17, the second stage SB2 is succeeded by an eighth stage SB8. At the eighth stage SB8, the decoder 17 processes the shaped signal into the call tone signal. Responsive to the call tone signal, the driver circuit 22 drives the loudspeaker 21 like the above-described case where the shaped signal is coincident with the secondary directory number signal. As a result, the loudspeaker 21 generates the audible tone.

The eighth stage SB8 proceeds to a ninth stage SB9. A predetermined count number is determined in the decoder 17 and is equal to two in this embodiment. Therefore, the decoder 17 is referred to as a count number determining arrangement. At the ninth stage SB9, the decoder 17 carries out judgement whether or not the reset switch 23 is closed. When the reset switch 23 is closed, the ninth stage SB9 proceeds to a tenth stage SB10 which will presently be described. Otherwise, the ninth stage SB9 is repeatedly carried out.

At the tenth stage SB10, the decoder 17 carries out judgement whether or not the reset switch 23 is closed again. In other words, the decoder 17 carries out judgement whether or not the counted result signal is representative of the predetermined count number, namely, two. In this manner, the decoder 17 counts up a count of representative of how many times the tone stop instruction signal is produced, and produces a counted result signal representative of the count. Herein, the decoder 17 is referred to as a counting arrangement.

When the reset switch 23 is not closed, the tenth stage SB10 is repeatedly carried out. Namely, the audible tone is not stopped in spite of closing of the reset switch 23.

In this manner, the decoder 17 serves as a restricting arrangement which restricts the stop of the audible tone unless the tone stop instruction signal is repeatedly produced after production of the particular signal.

When the counted result signal is representative of the predetermined count number with the reset switch 23 being closed again, the decoder 17 produces a count number signal. Herein, the decoder 17 is referred to as the judgement carrying out arrangement.

The tenth stage SB10 proceeds to the seventh stage SB7 at which decoder 17 makes the loudspeaker 21 stop generation of the audible tone. Herein, the decoder 17 serves as the releasing arrangement.

With the radio paging receiver, the possessor can surely recognize reception of the primary call signal because the audible tone is not stopped unless the reset switch 23 is closed twice.

Figure 4:
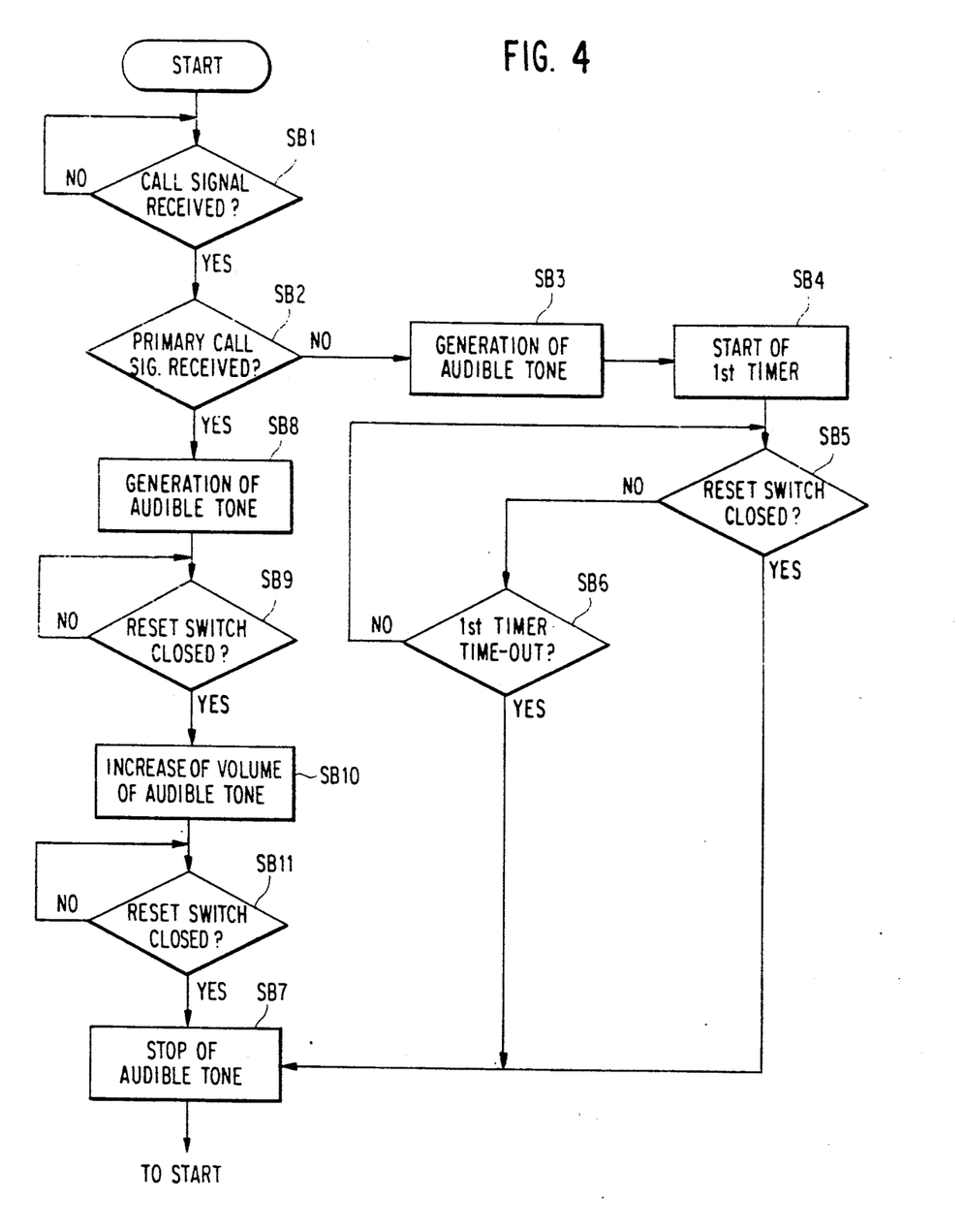
FIG. 4 is a flow chart for use in describing operation of a radio paging receiver according to a first modification of the radio paging receiver illustrated in FIG. 3.

Referring to FIG. 4 together with FIG. 1, description will be made as regards a first modification of the radio paging receiver according to the second embodiment of this invention. For convenience, the description is omitted about the first through tenth stages SB1 through SB10 which are similar to the stages designated by like reference numerals.

When the reset switch 23 is closed, the ninth stage SB9 proceeds to an eleventh stage SB11 at which the decoder 17 makes the loudspeaker 21 increase the volume of the audible tone. The eleventh stage SB11 is succeeded by the tenth stage SB10 at which the decoder 17 carries out judgement whether or not the reset switch 23 is closed again.

Figure 5:
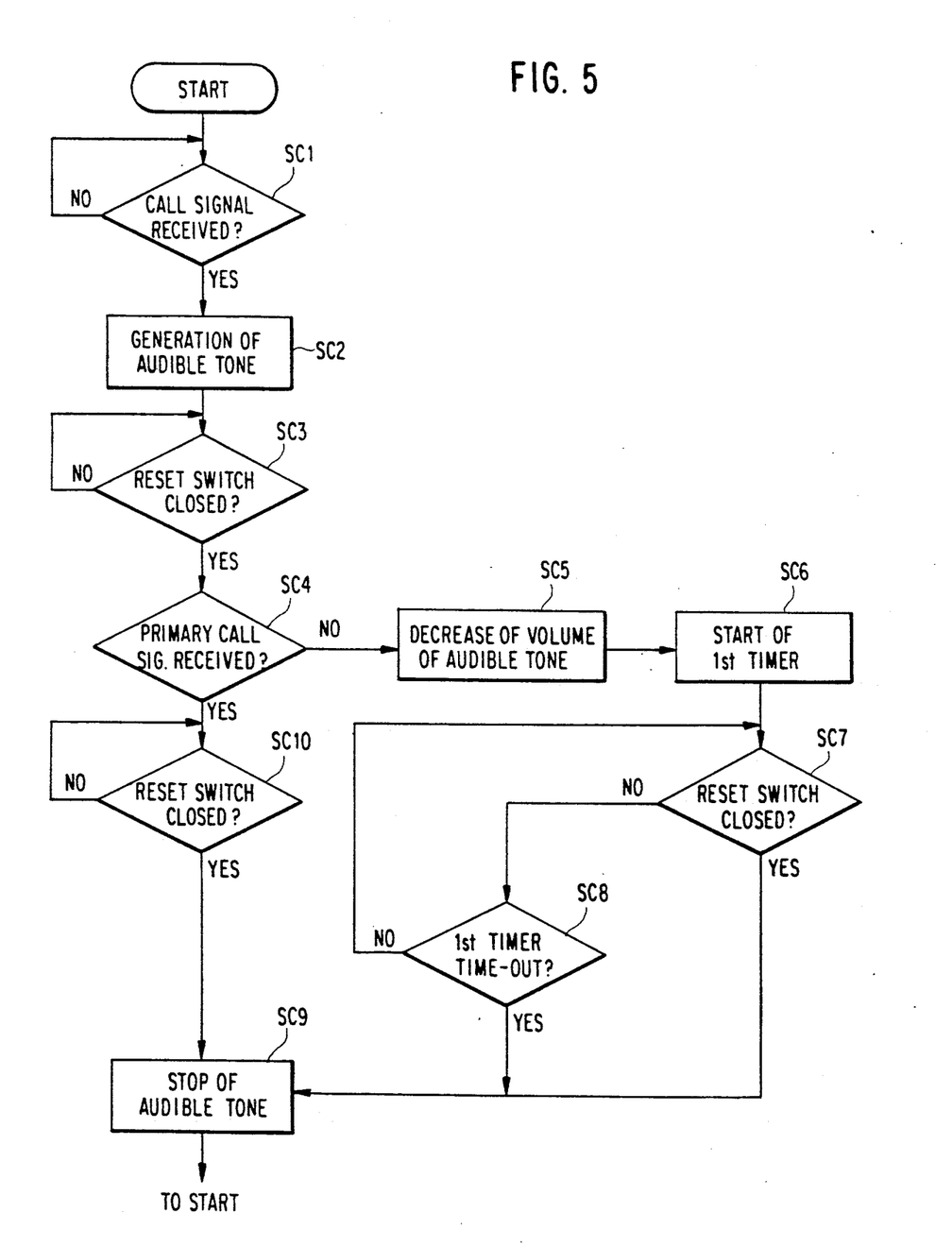
FIG. 5 is a flow chart for use in describing operation of a radio paging receiver according to a second modification of the radio paging receiver illustrated in FIG. 3.

Referring to FIG. 5 together with FIG. 1, description will be made in connection with a second modification of the radio paging receiver according to the second embodiment of this invention. When the decoder 17 is supplied with the shaped signal from the waveform shaper 16, the decoder 17 judges at a first stage SC1, in cooperation with the P-ROM 19, whether or not the shaped signal is related to one of the primary and the secondary directory number signals. That is, the decoder 17 judges with reference to the memorized content of the P-ROM 19 whether or not either one of the primary and the secondary call signals is received as the received signal. When the shaped signal is coincident with either one of the primary and the secondary directory number signals, the first stage SC1 proceeds to a second stage SC2. Otherwise, the first stage SC1 is repeatedly carried out.

At the second stage SC2, the decoder 17 processes the shaped signal into the call tone signal. Responsive to the call tone signal, the driver circuit 22 drives the loudspeaker 21. As a result, the loudspeaker 21 generates the audible tone in the manner known in the art.

The second stage SC2 proceeds to a third stage SC3. A predetermined count number is determined in the decoder 17 and is equal to two in this embodiment. Therefore, the decoder 17 is referred to as the count number determining arrangement. At the third stage SC3, the decoder 17 carries out judgement whether or not the reset switch 23 is closed. When the reset switch 23 is closed, the third stage SC3 proceeds to a fourth stage SC4 which will presently be described. Otherwise, the third stage SC3 is repeatedly carried out.

At the fourth stage SB4, the decoder 17 carries out judgement whether or not the shaped signal is coincident with the primary directory number signal. Herein, the decoder 17 serves as the judging arrangement. When the shaped signal is not coincident with the primary directory number signal, the fourth stage SC4 is followed by a fifth stage SC5 at which the decoder 17 makes the loudspeaker 21 decreases the volume of the audible tone.

The fifth stage SC5 is succeeded by a sixth stage SC6 at which the decoder 17 makes the first timer 171 start its operation when the shaped signal is processed into the call tone signal. The first timer 171 produces a first time-out signal when the first predetermined time duration lapses after start of operation of the first timer 171. The first predetermined time duration may be twenty through thirty seconds long. The sixth stage SC6 proceeds to a seventh stage SC7.

At the seventh stage SC7, the decoder 17 carries out judgement whether or not the reset switch 23 is closed. When the reset switch 23 is not closed, the seventh stage SC7 proceeds to an eighth stage SC8 which will presently be described. When the reset switch 23 is closed to produce the tone stop instruction signal, the seventh stage SC7 is succeeded by a ninth stage SC9 at which the decoder 17 makes the loudspeaker 21 stop generation of the audible tone. Therefore, the decoder 17 may be referred to herein as the controlling arrangement.

At the eight stage SC8, the decoder 17 carries out judgement whether or not the first time-out signal is produced. When the judgement indicates a negative result, operation returns to the seventh stage SC7. When the judgement indicates an affirmative result, the eighth stage SC8 proceeds to the ninth stage SC9 at which the decoder 17 makes the loudspeaker 21 stop generation of the audible tone.

Description will return to the fourth stage SC4. When the shaped signal is coincident with the primary directory number signal, the decoder 17 produces a particular signal. When the particular signal is produced in the decoder 17, the fourth stage SC4 is succeeded by a tenth stage SC10.

At the tenth stage SC10, the decoder 17 carries out judgement whether or not the reset switch 23 is closed again. In other words, the decoder 17 carries out judgement whether or not the counted result signal is representative of the predetermined count number, namely, two. In this manner, the decoder 17 counts up a count representative of how many times the tone stop instruction signal is produced, and produces the counted result signal representative of the count. Herein, the decoder 17 is referred to as the counting arrangement.

When the reset switch 23 is not closed, the tenth stage SC10 is repeatedly carried out. Namely, the audible tone is not stopped unless the reset switch 23 is closed again.

In this manner, the decoder 17 serves as a restricting arrangement which restricts the stop of the audible tone unless the tone stop instruction signal is repeatedly produced after production of the particular signal.

When the counted result signal is representative of the predetermined count number with the reset switch 23 being closed again, the decoder 17 produces the count number signal. Herein, the decoder 17 is referred to as the judgement carrying out arrangement.

The tenth stage SC10 proceeds to the ninth stage SC9 at which the decoder 17 makes the loudspeaker 21 stop generation of the audible tone.

Figure 6:
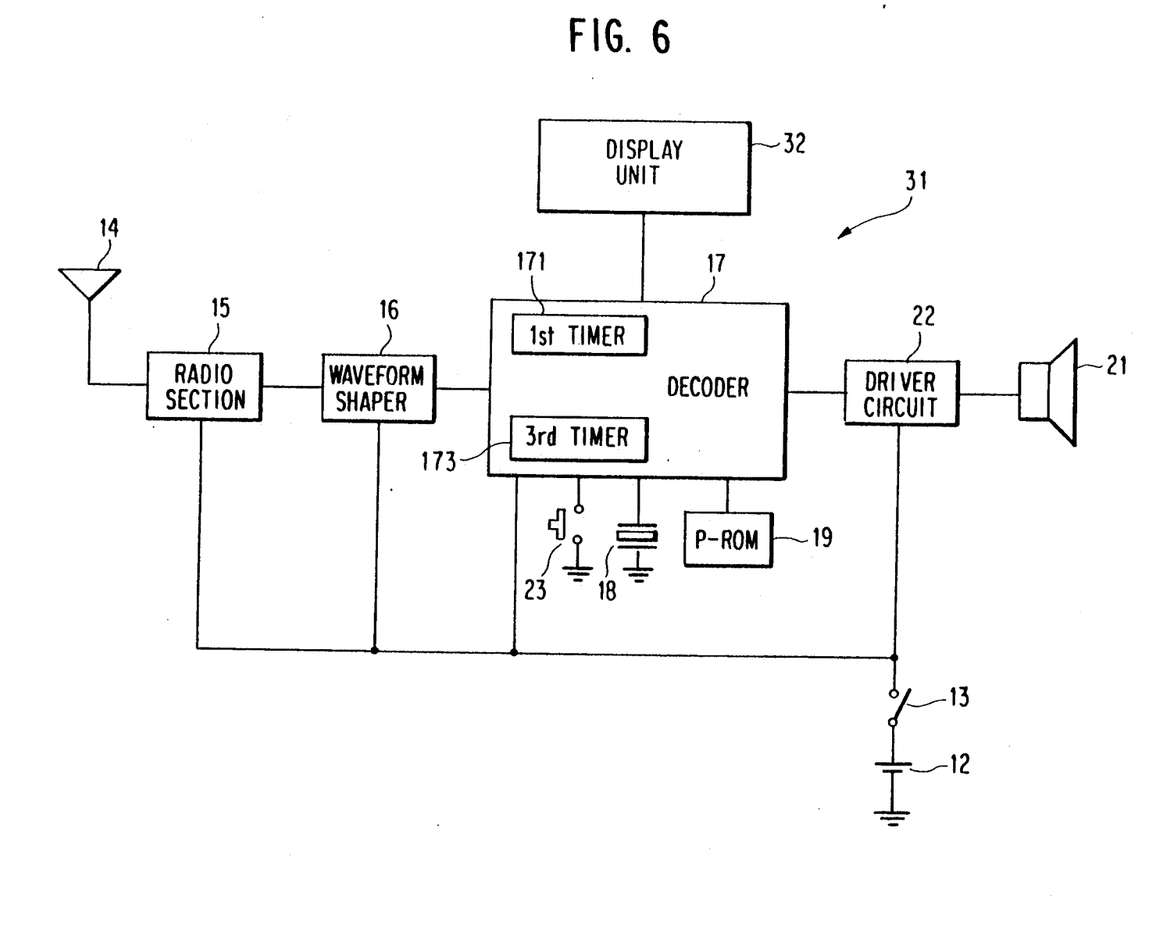
FIG. 6 is a block diagram of a radio paging receiver according to a third embodiment of this invention.

Referring to FIG. 6, description will proceed to a radio paging receiver 31 according to a third embodiment of this invention. The radio paging receiver 31 comprises similar parts designated by like reference numerals.

The radio paging receiver 31 is capable of carrying out various operations in response to each of the primary and the secondary call signals. Each of the primary and the secondary call signals comprises a call number signal and a message signal following the call number signal. The call number signal represents the primary or the secondary call numbers assigned to the radio paging receiver 31 to which the message signal should be directed.

In order to enable visual display of messages carried by the message signal, the radio paging receiver 31 further comprises a display unit 32 connected to the decoder 17. Responsive to the message signal, the display unit 32 provides visual display of the messages as will later become clear.

The decoder 17 further comprises a third timer 173 coupled to the quarts crystal oscillator for determining a third predetermined time duration which will later become clear. The third timer is referred to as an internal time determining arrangement.

Figure 7:
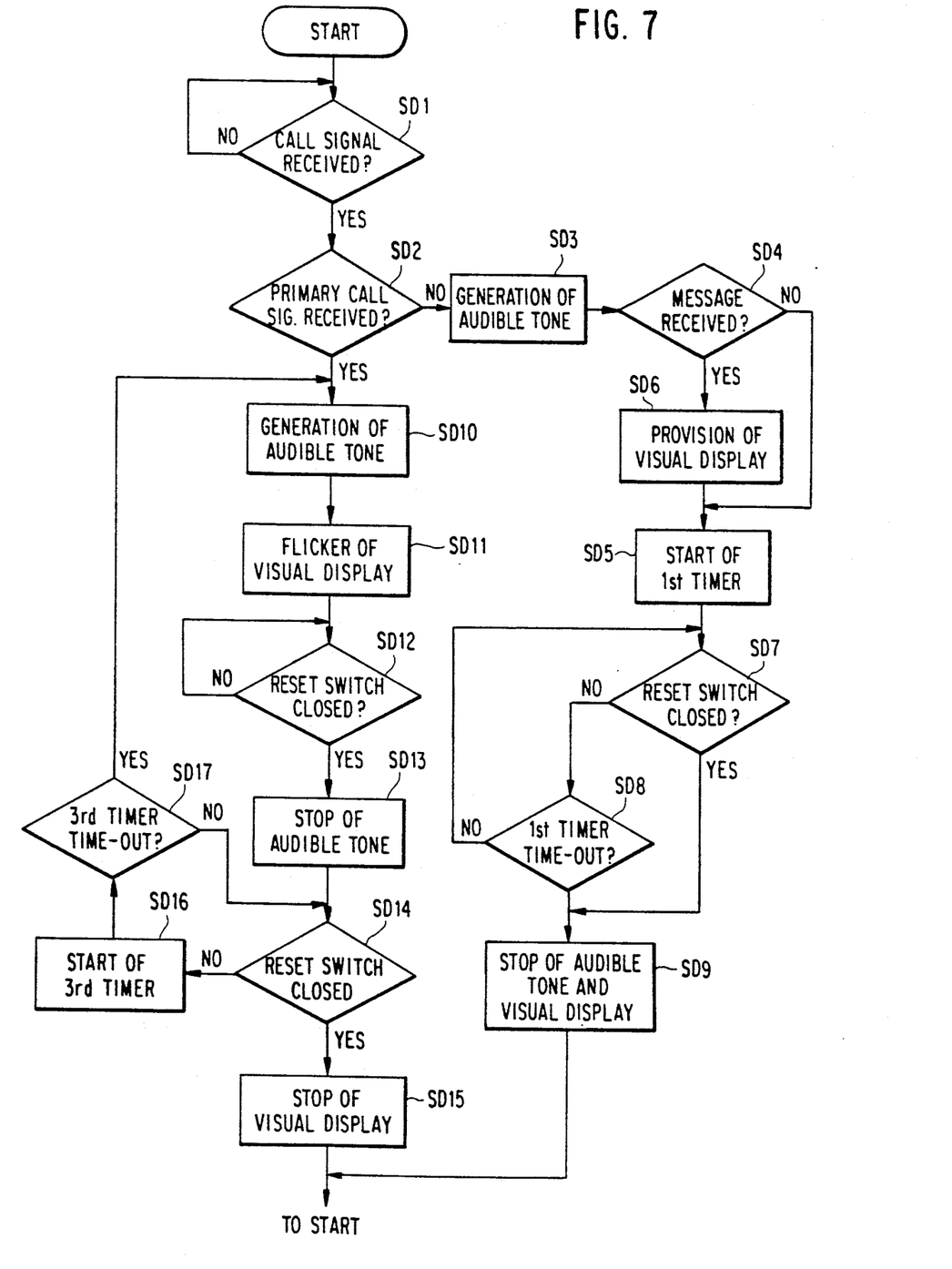
FIG. 7 is a flow chart for use in describing operation of the radio paging receiver illustrated in FIG. 6.

Referring to FIG. 7 together with FIG. 6, operation of the decoder 17 will be described in detail. When the decoder 17 is supplied with the shaped signal from the waveform shaper 16, the decoder 17 judges at a first stage SD1, in cooperation with the P-ROM 19, whether or not the shaped signal is related to one of the primary and the secondary directory number signals. That is, the decoder 17 judges with reference to the memorized content of the P-ROM 19 whether or not either one of the primary and the secondary call signals is received as the received signal. When the shaped signal is coincident with one of the primary and the secondary directory number signals, the first stage SD1 proceeds to a second stage SD2. Otherwise, the first stage SD1 is repeatedly carried out.

At the second stage SD2, the decoder 17 carries out judgement whether or not the shaped signal is coincident with the primary directory number signal. Herein, the decoder 17 serves as the judging arrangement. When the shaped signal is not coincident with the primary directory number signal, the stage SD2 is followed by a third stage SD3.

At the third stage SD3, the decoder 17 processes the shaped signal into the call tone signal. Responsive to the call tone signal, the driver circuit 22 drives the loudspeaker 21. As a result, the loudspeaker 21 generates the audible tone in the manner known in the art.

The third stage SD3 is succeeded by a fourth stage SD4 at which the decoder 17 carries out judgement whether or not the shaped signal comprises a message part produced dependent on the message signal. When the message part is not present in the shaped signal, the fourth stage SD4 is followed by a fifth stage SD5.

When the shaped signal comprises a message part, the fourth stage SD4 proceeds to a sixth stage SD6 at which the decoder 17 energizes the display unit 32 to provide the visual display of the message. The sixth stage SD6 is succeeded by the fifth stage SD5.

At the fifth stage SD5, the decoder 17 makes the first timer 171 start operation of the first timer 171. The first timer 171 produces a first time-out signal when the first predetermined time duration lapses after operation of the first timer 171 is started. The first predetermined time duration may be twenty through thirty seconds long. The fifth stage SD5 proceeds to a seventh stage SD7.

At the seventh stage SD7, the decoder 17 carries out judgement whether or not the reset switch 23 is closed. When the reset switch 23 is not closed, the fifth stage SD5 proceeds to a sixth stage SD6 which will presently be described. When the reset switch 23 is closed to produce the tone stop instruction signal, the seventh stage SD7 is succeeded by an eighth stage SD8 at which the decoder 17 makes the loudspeaker 21 stop generation of the audible tone. Therefore, the decoder 17 may be referred to herein as the controlling arrangement.

At the eighth stage SD8, the decoder 17 carries out judgement whether or not the first time-out signal is produced. When the judgement indicates a negative result, operation returns to the seventh stage SD7. When the judgement indicates an affirmative result, the seventh stage SD7 proceeds to the ninth stage SD9 at which the decoder 17 makes the loudspeaker 21 stop generation of the audible tone. Simultaneously, the decoder 17 deenergize the display unit 32 so that the visual display of the message disappears from the display unit 32.

Description will return to the second stage SD2. When the shaped signal is coincident with the primary directory number signal, the decoder 17 produces a particular signal. When the particular signal is produced in the decoder 17, the second stage SD2 is succeeded by a tenth stage SD10. At the tenth stage SD10, the decoder 17 processes the shaped signal into the call tone signal. Responsive to the call tone signal, the driver circuit 22 drives the loudspeaker 21 like the above-described case where the shaped signal is coincident with the secondary directory number signal. As a result, the loudspeaker 21 generates the audible tone.

Figure 8A:
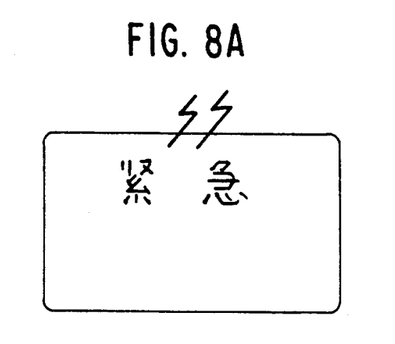
FIGS. 8A, 8B, and 8C show various examples of displaying on a display unit included in the radio paging receiver illustrated in FIG. 6.
Figure 8B:
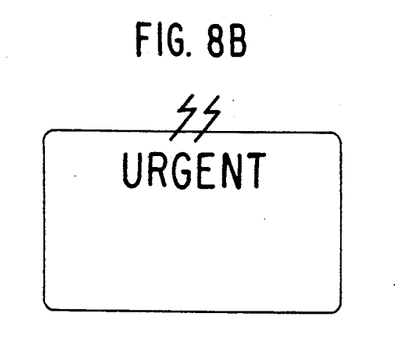
Figure 8C:
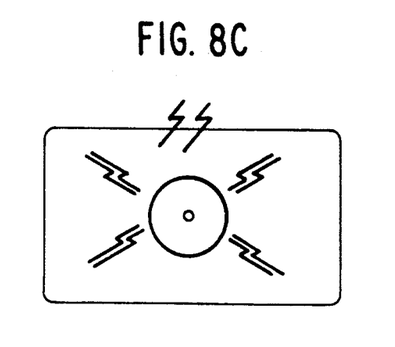

The tenth stage SD10 proceeds to an eleventh stage SD11. At the eleventh stage SD11, the decoder 17 makes the display unit 32 intermittently display a predetermined one of various messages which are depicted in FIGS. 8A, 8B, and 8C. Herein, the decoder 17 serves as an energizing arrangement.

The eleventh stage SD11 proceeds to a twelfth stage SD12. A predetermined count number is determined in the decoder 17 and is equal to two in this embodiment. Therefore, the decoder 17 is referred to as the count number determining arrangement. At the twelfth stage SD12, the decoder 17 carries out judgement whether or not the reset switch 23 is closed. When the reset switch 23 is closed, the twelfth stage SD12 proceeds to a thirteenth stage SD13 which will presently be described. Otherwise, the twelfth stage SD12 is repeatedly carried out.

At the thirteenth stage SD13, the decoder 17 makes the loudspeaker 21 stop generation of the audible tone with the display unit 32 intermittently displaying the predetermined message. Herein, the decoder 17 serves as a temporal preventing arrangement. The thirteenth stage SD13 proceeds to a fourteenth stage SD14.

At the fourteenth stage SD14, the decoder 17 carries out judgement whether or not the reset switch 23 is closed again. In other words, the decoder 17 carries out judgement whether or not the counted result signal is representative of the predetermined count number, namely, two. In this manner, the decoder 17 counts up a count of representative of how many times the tone stop instruction signal is produced, and produces a counted result signal representative of the count. Herein, the decoder 17 is referred to as the counting arrangement.

When the counted result signal is representative of the predetermined count number with the reset switch 23 being closed again, the decoder 17 produces the count number signal. Herein, the decoder 17 is referred to as the judgement carrying out arrangement.

When the reset switch 23 is closed, the fourteenth stage SD14 is followed by a fifteenth stage SD15 at which the decoder 17 deenergizes the display unit 32 so that the visual display of the messages disappears from the display unit 32. Herein, the decoder 17 serves as a deenergizing arrangement. Otherwise, the fourteenth stage SD14 is succeeded by the sixteenth stage SD16.

At the sixteenth stage SD16, the decoder 17 makes the third timer 173 start operation of the third timer 173. The third timer 173 produces a third time-out signal when the third predetermined time duration lapses after start of operation of the third timer 173. The third predetermined time duration may be twenty through thirty seconds long. The sixteenth stage SD16 proceeds to a seventeenth stage SD17.

At the seventeenth stage SD17, the decoder 17 carries out judgement whether or not the third time-out signal is produced. When the judgement indicates a negative result, operation returns to the fourteenth stage SD14. When the fourteenth, the sixteenth, and the seventeenth stages SD14, SD16, and SD17 are carried out, the decoder 17 serves as a temporal preventing arrangement for temporally preventing the restricting arrangement from restricting the stop of the audible tone during the third time duration.

When the judgement indicates an affirmative result, the seventeenth stage SD17 proceeds to the tenth stage SD10 at which the decoder 17 makes the loudspeaker 21 generate the audible tone again.

In this manner, the decoder 17 serves as a restricting arrangement which restricts the stop of the audible tone unless the tone stop instruction signal is twice produced after production of the particular signal although the audible tone is produced again after the audible tone is stopped when the tone stop instruction signal is once produced.

With the radio paging receiver, the possessor can surely recognize reception of the primary call signal because the audible tone is not stopped unless the reset switch 23 is closed twice.

Before each of the stages SB9, SC3, and SD12 is carried out, a specific count number is predetermined in the decoder 17. The specific count number is less than the predetermined count number and is equal to one in this embodiment. In this event, the decoder 17 serves as a specific number determining arrangement.

When each of the stages SB9, SC3, and SD12 is carried out, the decoder 17 serves as a specific carrying out arrangement for carrying out judgement whether or not the counted result signal is representative of the specific count number. When the counted result signal is representative of said specific count number, the specific carrying out arrangement produces a specific count number signal.

When each of the stages SB11, SC5, and SD13 is carried out, the decoder 17 serves as an internal controlling arrangement for controlling the operation of the generating arrangement so that the audible tone is modified in response to the specific count number signal.

While the present invention has thus far been described in connection with only a few embodiment thereof, it will readily be possible for those skilled in the art to put this invention into practice in various other manners. For example, different audible tones may be produced in response to receptions of the primary and the secondary call signals, respectively. Although the description has been made as regards the radio paging receiver in which one of the call signals is used for carrying out a normal call of the possessor, the radio paging receiver may be supplied with two or more call signals for carrying out the normal call.

What is claimed is:

1. A radio communication apparatus comprising:
   receiving means for receiving, as a received signal, each of a primary and a secondary call signal to produce an internal signal;
   generating means connected to said receiving means for generating an audible tone in response to said internal signal;
   manually operable producing means for producing a tone stop instruction signal;
   means connected to said receiving means said generating means and said manually operable producing means for controlling operation of said generating means so that said audible tone is stopped in response to said tone stop instruction signal;
   judging means connected to said receiving means for judging whether or not said received signal is said primary call signal, said judging means producing a particular signal when said received signal is said primary call signal; and
   restricting means connected to said generating, said manually operable producing, and said judging means for restricting stop of said audible tone with reference to said particular signal regardless of the tone stop instruction signal produced after said particular signal.

2. A radio communication apparatus as claimed in claim 1, wherein said restricting means restricts said stop of the audible tone unless said tone stop instruction signal is continuously produced during a predetermined time interval after production of said particular signal.

3. A radio communication apparatus as claimed in claim 1, wherein said restricting means restricts said stop of the audible tone unless said tone stop instruction signal is twice produced after production of said particular signal although said audible tone is produced again after said audible tone is stopped when said tone stop instruction is once produced.

4. A radio communication apparatus as claimed in claim 1, wherein said restricting means restricts said stop of the audible tone unless said tone stop instruction signal is repeatedly produced after production of said particular signal without being again produced with said audible tone when said tone stop instruction signal is once produced.

5. A radio communication apparatus as claimed in claim 1, wherein said controlling means further comprises:
   time determining means for determining a predetermined time duration;
   judgement carrying out means connected to said receiving means said manually operable producing means, said judging means and said time determining means and responsive to said internal and said particular signals for carrying out judgement whether or not said manually operable producing means continuously produces said tone stop instruction signal during said predetermined time duration, said judgement carrying out means producing a time out signal when said tone stop instruction signal is continuously produced during said predetermined time duration; and
   releasing means connected to said restricting and said judgement carrying out means for preventing said restricting means from restricting said stop of the audible tone in response to said time out signal.

6. A radio communication apparatus as claimed in claim 1, wherein said controlling means further comprises:
   count number determining means for determining a predetermined count number which is equal to at least two;
   counting means connected to said receiving, said judging means and said manually operable producing means and responsive to said internal and said particular signals for counting up a count representative of how many times said tone stop instruction signal is produced, said counting means producing a counted result signal representative of said count;
   judgement carrying out means connected to said count number determining means and said counting means for carrying out judgement whether or not said counted result signal is representative of said predetermined count number, said judgement carrying out means producing a count number signal when said counted result signal is representative of said predetermined count number; and
   releasing means connected to said restricting and said judgement carrying out means for preventing said restricting means from restricting said stop of the audible tone in response to said count number signal.

7. A radio communication apparatus as claimed in claim 6, wherein said controlling means further comprises:
    specific count number determining means for determining a specific count number which is less than said predetermined count number;
    specific carrying out means connected to said specific count number determining means and said counting means for carrying out judgement whether or not said counted result signal is representative of said specific count number, said specific carrying out means producing a specific count number signal when said counted result signal is representative of said specific count number; and
    internal controlling means connected to said generating and said specific carrying out means for controlling said operation of the generating means so that said audible tone is modified in response to the specific count number signal.

8. A radio communication apparatus as claimed in claim 7, wherein said internal controlling means comprises means connected to said generating and said specific carrying out means for controlling a volume of the audible tone in response to said specific count number signal.

9. A radio communication apparatus as claimed in claim 7, wherein said internal controlling means comprises:
    internal time determining means for determining a specific time duration; and
    temporal preventing means coupled to said restricting, said specific carrying out, and said internal time determining means and responsive to said specific count number signal for temporally preventing said restricting means from restricting said stop of the audible tone during said specific time duration,
    said releasing means being for preventing said restricting means from restricting said stop of the audible tone in response to said count number signal while said temporal preventing means temporally prevents said restricting means from restricting said stop of the audible tone.

10. A radio communication apparatus as claimed in claim 6, further comprising visual displaying means for displaying a visual message, wherein said radio communication apparatus further comprises:
    energizing means connected to said receiving means, said judging means, and said visual displaying means for intermittently energizing said visual displaying means for display of a predetermined message in response to said internal and said particular signals; and
    deenergizing means connected to said judgement carrying out means and responsive to said count number signal for deenergizing said visual displaying means to stop said display.

11. A radio communication apparatus comprising:
    receiving means for receiving, as a received signal, each of a primary and a secondary call signal to produce an internal signal;
    generating means connected to said receiving means for generating an audible tone in response to said internal signal;
    manually operable producing means for producing a tone stop instruction signal;
    first means connected to said receiving, said generating means, and said manually operable producing means for controlling operation of said generating means so that said audible tone is stopped in response to said tone stop instruction signal;
    judging means connected to said receiving means for judging whether or not said received signal is said primary call signal, said judging means producing a first signal when said received signal is said primary call signal; and
    second means connected to said generating means, said manually operable producing means, and said judging means for continuing the generation of said audible tone at a predetermined level with reference to said particular signal regardless of the tone stop instruction signal produced after said first signal.

* * * * *